(12) United States Patent  
Wang et al.

(10) Patent No.: US 9,307,017 B2  
(45) Date of Patent: Apr. 5, 2016

(54) MEMBER-ORIENTED HYBRID CLOUD OPERATING SYSTEM ARCHITECTURE AND COMMUNICATION METHOD THEREOF

(71) Applicant: INSPUR ELECTRONIC INFORMATION INDUSTRY CO., LTD, Jinan (CN)

(72) Inventors: Endong Wang, Jinan (CN); Dong Zhang, Jinan (CN); Zhengwei Liu, Jinan (CN); Kaiyuan Qi, Jinan (CN); Junpeng Liu, Jinan (CN); Feng Guo, Jinan (CN); Chenping Liu, Jinan (CN); Fei Gao, Jinan (CN); Bo Zhu, Jinan (CN)

(73) Assignee: INSPUR ELECTRONIC INFORMATION INDUSTRY CO., LTD, Jinan (CN)

(*) Notice: Subject to any disclaimer, the term of this patent is extended or adjusted under 35 U.S.C. 154(b) by 0 days.

(21) Appl. No.: 14/534,735

(22) Filed: Nov. 6, 2014

(65) Prior Publication Data

US 2015/0067135 A1 Mar. 5, 2015

Related U.S. Application Data

(63) Continuation of application No. PCT/CN2014/071233, filed on Jan. 23, 2014.

(30) Foreign Application Priority Data

Aug. 22, 2013 (CN) .......................... 2013 1 0367864

(51) Int. Cl.
*H04L 12/24* (2006.01)
*H04L 29/08* (2006.01)
(Continued)

(52) U.S. Cl.
CPC ........ *H04L 67/1002* (2013.01); *G06F 9/45558* (2013.01); *G06F 9/5072* (2013.01);
(Continued)

(58) Field of Classification Search
CPC ............ H04L 41/5054; H04L 41/0803; H04L 43/0817; H04L 43/04; H04L 63/10; H04L 67/10; G06F 9/45558; G06F 2009/4557; G06F 9/5072
See application file for complete search history.

(56) References Cited

U.S. PATENT DOCUMENTS

| | | | |
|---|---|---|---|
| 2012/0110570 A1 | 5/2012 | Jacobson et al. | |
| 2015/0235308 A1* | 8/2015 | Mick | G06Q 30/08 705/26.3 |

FOREIGN PATENT DOCUMENTS

| | | |
|---|---|---|
| CN | 1722664 | 1/2006 |
| CN | 102411541 | 4/2012 |

(Continued)

OTHER PUBLICATIONS

Mingjie Li, "Inspur cloud sca OS V2.0 product explanation (F)", Science and Technology Inspur, No. 4, pp. 30-31, Apr. 2012.

(Continued)

*Primary Examiner* — Chirag R Patel
(74) *Attorney, Agent, or Firm* — Hamre, Schumann, Mueller & Larson, P.C.

(57) ABSTRACT

A member-oriented hybrid cloud operating system architecture and a communication method thereof are provided. A hybrid architecture is established based on layer, object and message models, and a member-oriented idea is applied to manage constituent members and a processing environment thereof. On this basis, high-efficient routing, read-write separation and load balancing are performed on a member processing cluster, satisfying the requirements of being open and compatible, loosely coupled and extensible of a cloud operating system, and solving the self-management problem, the horizontal scaling problem of members and the high-availability problem of stateful members of the existing cloud operating system.

2 Claims, 8 Drawing Sheets

(51) Int. Cl.
  *H04L 29/06* (2006.01)
  *G06F 9/455* (2006.01)
  *G06Q 10/06* (2012.01)
  *G06F 9/50* (2006.01)

(52) U.S. Cl.
  CPC ........... *G06Q 10/06* (2013.01); *H04L 41/5054* (2013.01); *H04L 63/10* (2013.01); *H04L 67/10* (2013.01); *H04L 67/1008* (2013.01); *H04L 67/1034* (2013.01); *H04L 67/40* (2013.01); *H04L 41/0803* (2013.01); *Y04S 40/162* (2013.01)

(56) References Cited

FOREIGN PATENT DOCUMENTS

| CN | 102521022 | 6/2012 |
|----|-----------|--------|
| CN | 102970332 | 3/2013 |
| CN | 103442049 | 12/2013 |

OTHER PUBLICATIONS

Office Action issued Dec. 30, 2015 in corresponding Chinese patent application and partial English translation thereof, 6 pages total.

* cited by examiner

MEMBER-ORIENTED HYBRID CLOUD OPERATING SYSTEM ARCHITECTURE AND COMMUNICATION METHOD THEREOF

FIELD

The discosure herein relates to the field of cloud computing, and in particular to a member-oriented hybrid cloud operating system architecture and a communication method thereof.

BACKGROUND

With the rise of cloud computing, the traditional data center is rapidly transforming into the cloud data center. In the tour stages of physical resource integration, application and virtualization conjunction, automated management and data center collaboration of the evolution from a primary form to an advanced form of the data center, a cloud operating system (COS) plays an important role, bears an intermediate function of the interface application to the upper side and management software to the lower side, fuses a large amount of heterogeneous devices into a logic resource pool to he dynamically scheduled to a cloud application, and achieves a service for a terminal.

The cloud data center environment has the characteristics of being dynamic, heterogeneous, large-scale and single-point, and being easily invalidated; therefore, the COS needs to apply a wide and compatible open architecture, both considers the compatibility for third-party software and hardware and takes secondary development into consideration, and provides a perfect standard interface API; as regards the dynamic change demands for functions of the cloud computing environment, the COS needs to apply an extensible memberized design, which is, on the basis of the basic members of virtualization, resource scheduling etc., convenient for being developed in a value-added manner and deployed as required for members of operation and maintenance management, metering and billing, self-service etc.; in addition, the COS also needs to apply a scalability and high-availability design to achieve the goal of scale extension and service continuity which is pursued by cloud computing.

As regards the requirements of being loosely coupled, extensible, scalable and highly-available for the COS by the cloud data center, applying a single module architecture of the traditional OS may achieve highly-efficient calling among COS modules, but the coupling is close, the structure is complicated, and the system is hard to extend; applying a layer architecture may make the organization structure and dependency relationship among various modules clear, and improve the reliability, portability and maintainability of the COS, but the software stack layer is so deep that the core is too large, and the coupling degree among modules is still relatively high, which is not suitable for constructing a distributed processing environment; and on the basis of the above-mentioned architectures, open source software OpenStack and CloudStack establish a loosely coupled cloud management architecture based on a message queue, but lack a member-oriented design, cannot control the member life period, and need constituent modules to take scaling and high-available methods into consideration by themselves, which makes the development and deployment burden and operation overhead of the modules heavier. Following the high cohesion and low coupling principle, management of the members should be enhanced from the COS level, and the extensibility, scalability and high availability thereof should be ensured, wherein the main problems faced are:

1. the current cloud operating system lacks self-includance, cannot describe and manage constituent members, and cannot dynamically monitor the processing environment thereof either.

2. As regards the highly-available processing cluster of the members, the existing communication protocol is designed based on unstateful assumption of the members, lacks a read-write separation mechanism and load balancing strategy, and cannot achieve high availability and high performance support for the stateful member processing cluster.

3. As regards the horizontal scaling processing cluster of the members, the existing tree-based routing algorithm efficiency is influenced by the enlargement of the keyword scale, while a Hash-based routing algorithm will result in a large amount of data movements when nodes change, and a data distribution method for balancing the load of heterogeneous nodes is lacking.

Therefore, how to provide a management and monitoring mechanism for members and the processing cluster thereof in the COS and how to realize high-efficient routing and load balancing of messages have become technical problems which urgently need to be solved in the COS architecture.

SUMMARY

The embodiments disclosed herein can help provide a member-oriented hybrid cloud operating system architecture and a communication method thereof The embodiments disclosed herein can be achieved by the followings:

a member-oriented hybrid cloud operating system, establishing a hybrid architecture based on layer, object and message models, and applying a member-oriented idea to manage constituent members and a processing environment thereof, and on this basis, performing high-efficient routing, read-write separation and load balancing on a member processing cluster, satisfying the requirements of being open and compatible, loosely coupled and extensible for a cloud operating system, and solving the self-management problem, the horizontal scaling problem of members and the high availability problem of stateful members of the existing cloud operating system, from the perspective of the layer model, the system being divided into a portal layer, a logic layer, an adaptation layer and an implementation layer from top to bottom, with each layer being relatively independent, the openness being enhanced by respectively defining a standard interface at each layer, and the compatibility being enhanced by adapting a different function at each layer;

from the perspective of the object model, the cloud operating system comprising functional modules of a cloud portal, cloud management portal, cloud resource management, monitoring management, metering and billing, service approval and authorization and authentication, with each functional component performing communication by Rest message-based calling, capable of being combined freely, and distributed and deployed as required, a new module being able to be developed in a value-added manner as required, and the extensibility of a platform being enhanced by realizing interoperation among different modules in the logic layer, and in an embodiment, a cloud operating system which is installed in a minimized manner only being composed of the modules of a cloud portal, cloud management portal and cloud resource management, and on this basis, monitoring, billing, approval or other modules being customized and extended as required, performing communication by Rest message-based calling, and being distributed, deployed and developed in a value-added manner as required, and the extensibility of the system being enhanced by realizing interoperation among different modules in the logic layer; and a message-based communication method being introduced to support asynchronous calling, and a message communication interface NIS being used to transmit the Rest message to make the system architecture further decoupled, and on this basis, a construction-oriented design being applied, and a member management portal being responsible for managing metadata of members and monitoring operation states thereof;

despite being able to realize extension, distribution and deployment as required, an object architecture belonging to an RPC (remote process call) synchronization communication method, a sending end is only able to continue execution after waiting for the return from a receiving end, and the processes of the two parties are closely coupled, and with the magnification and complication of the system, an association relationship among the members being over-complicated. Regarding this problem, a message-based communication method being introduced on the basis of the object architecture, a message communication interface JMS being used to transmit the Rest information, thus making the life periods of the sending and receiving ends different, supporting asynchronous calling and making the system structure further decoupled, and in an embodiment, the operations of aiming on, shutting down, suspending, etc. of a virtual machine between a portal and a cloud resource layer being realized in an asynchronous manner, and the portal being able to return without the need to wait for a response after sending out a command, thus improving user interaction effects;

the cloud operating system based on the above-mentioned hybrid architecture being able to satisfy the requirements of openness, compatibility and extension, and on this basis, based on a construction-oriented design idea, the member management portal being responsible for managing metadata information about the members, supporting the operations of registration, deletion, modification, querying etc., wherein, a member is a triple, comprising: a name, a service set, an access address, and a description;

a service is a quadruple, comprising: a name, a type, a message protocol, a parameter list, a key name, functional description, and a non-functional description;

in addition to describing and managing the members, a member management module further monitors a processing environment thereof, provides a basic service for ensuring the scalability and availability of the members, and perfecting the self-management capability of the cloud operating system, and when a member is registered, the system allocates a username user, a password psw and a unique member id thereto, and then a access process of the member processing cluster comprises:

1) the processing cluster initiating an access request to a system bus with an address being url, the system bus verifying a username, password and id of an access node, and if the verification is passed, establishing a connection, the code being:

Connection=ConnectionFactory.createConnection(user, psw,url);

2) establishing a write operation topic, and each processing node of the member subscribing to a write operation from the topic;
write_topic=sessionxreateTopic(id+"WRITE TOPIC");
write_topic_consumer=session.createConsumer(write_topic);

3) the member realizing write processing in an onMessage method of a writeTopicListener, and registering to the system bus;
write_topic_consumer.setMessagetistener(writeTopicListener);

4) establishing a read operation queue group according to the number mum of processing nodes of the member, each processing node corresponding to one queue subscription read operation
read_queue=session.createMultiQueue(num,id+"READ_QUEUE");
read_queue_consumer=session.createConsumer(read_queue); and 5) realizing a specific read processing function in an onMessage method of a readQueueListener, and registering to the system bus
$read_{13}$ queue consumer.setMessageListener(readQueueListener);

on the basis of the above-mentioned read-write separation queue groups, service types of various members are distinguished in the member management module, setting the service types as idempotent or non-idempotent, an idempotent operation belonging to an unstateful operation, the result of each execution in the same state being the same, and a non-idempotent operation belonging to a stateful operation, the result of each execution in the same state being different, a router performing routing according to the service type, the non-idempotent operation being sent to a unique write queue; and the idempotent operation being sent to different read queues according to a load balancing strategy;

a read operation load balancing process comprises:

1) calculating a processing capability of a node;
if a CPU frequency, memory capacity and I/O bandwidth of a node i are respectively $C_i$, $M_i$ and $B_i$, various resources of a cluster being the sums of various resources of nodes, i.e, $C=\Sigma C_i$, $M=\Sigma M_i$, $B=\Sigma B_i$;
then a CPU weight value of the node i is $W_i^{CPU}=C_i/C$, the memory capacity $W_i^{RAM}32\ M_i/M$, and the I/O bandwidth $W_i^{IO}=B_i/B$; and
if the required resource proportions of the member service are respectively $p^{CPU}$, $p^{RAM}$ and $p^{IO}$, the processing capability of the node i being $$W_i=p^{CPU}W_i^{CPU}+p^{RAM}W_i^{RAM}+p^{IO}W_i^{IO};$$

2) calculating the load of various nodes according to a read-write operation weight value;
if a read-write operation overhead ratio of a read queue $L_r$ to a write queue $L_w$ is a, a load of the node i being $L_i=L^R_i+aL^W_i$ and a load state of each node being $S_i=L_i/W_i$, and 3) selecting a node with the lightest load for routing;
the write operation being performed by means of a pipeline, so as to improve the data write-in efficiency, the process thereof being a node I being firstly written-in with data, after being written-M with a data fragment of 64 KB, while continuing to receive data, simultaneously forwarding the written-in 64 K data to a node 2, and receiving and forwarding data in the same manner from the node 2 to a node n until the node n is written-in with a last data fragment not exceeding 64 KB; and on the basis of the above-mentioned communication method, a node monitoring module further sending joining, quitting, invalidation and recovery events of the member processing node to the member management module, wherein a node joining event refers to adding a processing node to the member; a node quitting event refers to revoking a processing node from the member; a node invalidation event refers to one processing node of the member being unavailable; and a node revival event refers to one unavailable node of the member recovering availability.

The embodiments disclosed herein also provides a communication method for a member-oriented hybrid cloud operating system, comprising a highly-available member cluster communication method and a horizontal scaling member cluster communication method, wherein:

the highly-available member cluster communication method comprises: a member management module establishing a read-write separation queue group for each member cluster, the member management module further distinguishing service types of members into idempotent and non-idempotent, a router performing routing according to the service types, a non-idempotent operation being sent to a unique write queue, an idempotent operation being sent to different read queues according to a load balancing strategy, and on this basis, a node monitoring module sending joining, quitting, invalidation and recovery events of a processing node to the member management module, and the member management module further adjusting a queue structure according to a node change event, this method improving the communication performance of a stateful member cluster by means of read-write separation and load balancing, and adjusting the queue structure according to a node Change to ensure the high availability of a member, and the member management module further adjusting the queue structure according to the node change event sent by the monitoring module, the process being as follows:

1) when a node joins, establishing a read operation queue for the node in a queue group, and the node subscribing to a read operation from the queue, and subscribing to a write topic from the write topic;

2) when the node quits, deleting a read queue corresponding to the node, and closing the subscription to the write topic thereof;

3) when the node invalidates, stopping the sending of a read request to the read queue of the node, and reserving a write operation for the node in the write topic; and 4) when the node revives, synchronizing the write operation in the write topic, and recovering to send the read operation request to the read queue corresponding to the node;

an unstateful cluster load balancing method allocating operations to various nodes in a completely balanced way, which will result in inconsistent processing results in a stateful condition, and by establishing a read-write separation queue and balancing the load regarding node capabilities, the above-mentioned method being able to avoid this problem and improve the communication performance of the stateful member cluster, and adjusting the queue structure according to a node change event may ensure the high availability of the stateful cluster; and the horizontal scaling member cluster communication method comprises: the member management module establishing a polygon queue structure for each service of a member according to the number of nodes, performing binary lookup routing according to a Hash value, the algorithm efficiency being determined by the number of Hash packets which is much smaller than a keyword scale, improving the routing efficiency, and in the case where the number of nodes changes, only some node data states need to be adjusted, improving the dynamic scaling efficiency, and on the basis of the above-mentioned communication method, in an initialization stage, Hash intervals needing to be processed by various nodes being divided according to node processing capabilities, forming a routing table, realizing the distribution of data states according to proportions, and achieving load balancing;

the member management module establishing a polygon queue structure for each service of a member according to the number of nodes, each queue corresponding to one Hash value interval or packet, and performing binary lookup routing according to the Hash value, the routing algorithm being as follows:

1) calculating a Hash value h of a key;

2) initializing a lower limit i of a packet as 1, and an upper limit j of the packet as the total number of packets m;

3) repeating;

4) calculating a middle packet $t=(i+j)/2$, and checking whether the packet t contains h;

5) if h is smaller than a lower limit of the current packet, updating an upper limit $j=t-1$;

6) if h is greater than an upper limit of the current packet, updating a lower limit $i=t+1$; and 7) otherwise, returning to a node where an interval is located for routing; and the above-mentioned algorithm being equivalent to performing binary lookup by taking a packet as a node, the complexity being $O(\log_2 n)$, the algorithm efficiency being determined by the number of packets, and since the number of packets is much smaller than the keyword scale, the routing efficiency being improved, in addition, since a packet strategy is applied, only the keyword scale of some packets and data states of corresponding nodes need to be adjusted in the case where the number of nodes changes, improving the dynamic scaling efficiency.

The beneficial effects of the embodiments disclosed herein are: compared to the prior art, the member-oriented hybrid architecture provided in the disclosure herein perfects a memberized cloud operating system architecture which is open and compatible, extensible and loosely coupled, and the scalability and high availability of the cloud operating system are ensured by the communication methods of the horizontal scaling member cluster and highly-available cluster.

DETAILED DESCRIPTION

The embodiments of the disclosure herein will be described below in detail, in combination with the accompanying drawings and embodiments, whereby the implementation process of how the present application applies technical means to solve technical problems and achieve technical effects can be fully understood and implemented on this basis. It should be noted that if there is no conflict, the embodiments of the disclosure herein and various characteristics in the embodiments shall mutually fall within the scope of protection of the disclosure herein.

1. Member-Oriented Hybrid Cloud Operating System Architecture

Figure 1:
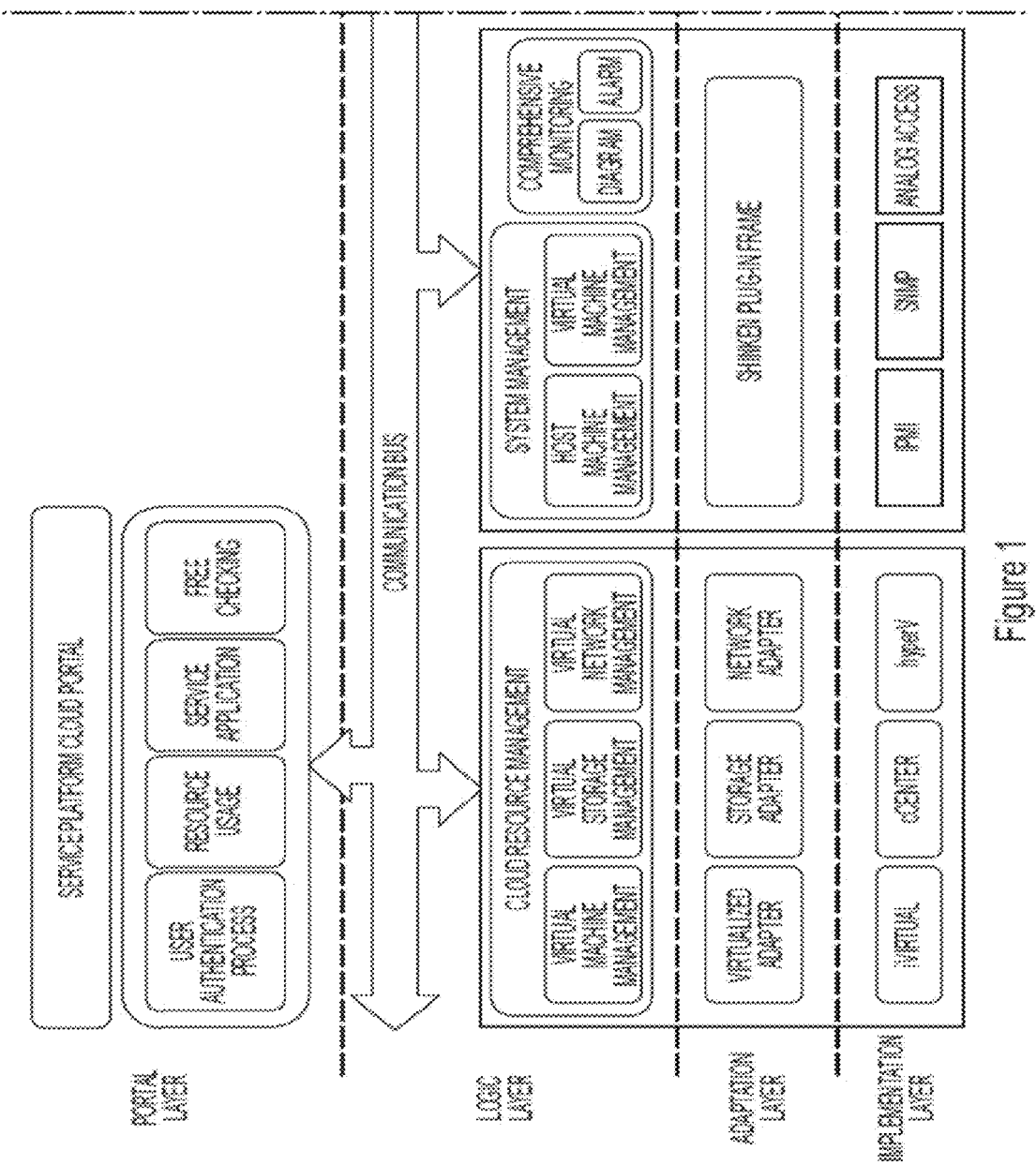
FIG. 1 is a diagram of a member-oriented hybrid COS architecture.
Figure 1:
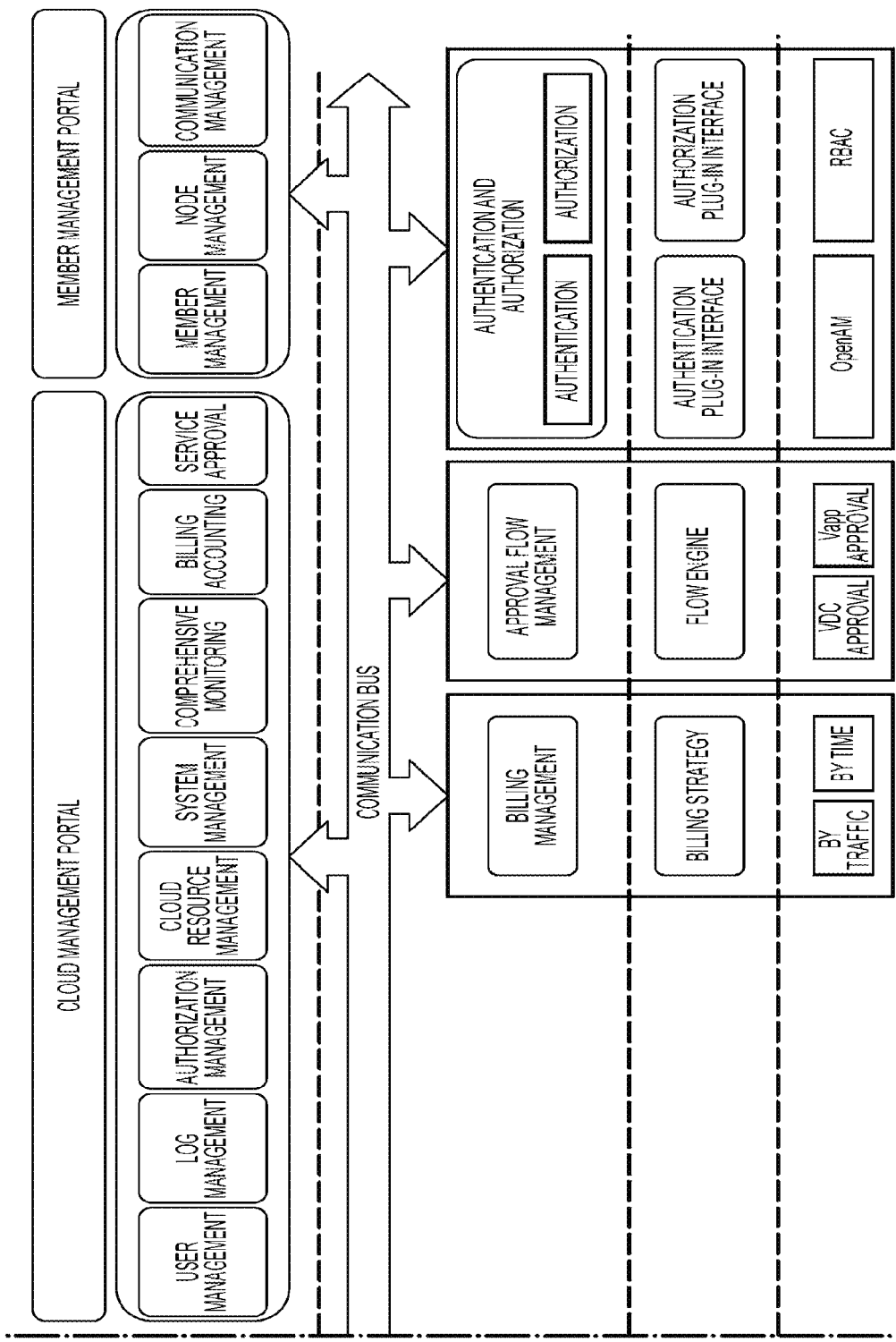

From the perspective of a layer model, a cloud operating system is divided into a portal layer, a logic layer, an adaptation layer and an implementation layer from top to bottom, as shown in FIG. 1. Each layer is relatively independent; the openness of the system is enhanced by respectively defining a standard interface at each layer; and the compatibility is enhanced by adapting a different function at each layer. In an embodiment, by peeling the portal layer, the separation of a user UI and functional logic may be realized, for example, the logic layer may support secondary development of the portal or third party by providing a uniform standard Rest API to the outside; and by abstracting a logic functional layer, the compatibility for various specific function implementations may be realized, for example, a cloud resource management module supports various virtualized infrastructures by means of a virtualized adapter; a monitoring management module is compatible with various monitoring protocols by means of an adaptation frame; a flow management module supports the customization of different approval flows by means of a flow engine; and a billing management and an authorization and authentication module support plug-in access by means of a reserved hook interface.

From the perspective of an object model, the cloud operating system is composed of the functional modules of a cloud portal, cloud management portal, cloud resource management, monitoring management, metering and billing, service approval, authorization and authentication etc., each functional component performing communication by Rest message-based calling, capable of being combined freely, and distributed and deployed as required, and a new module may be developed in a value-added manner as required, and the extensibility of a platform is enhanced by realizing interoperation among different modules in the logic layer. In an embodiment, a cloud operating system which is installed in a minimized manner is only composed of the modules of a cloud portal, cloud management portal and cloud resource management, and on this basis, monitoring, billing, approval or other modules may be customized and extended as required.

Despite being able to realize extension, distribution and deployment as required, an object architecture belongs to an RPC (remote process call) synchronization communication method, a sending end is only able to continue execution after waiting for the return from a receiving end, and the processes of the two parties are closely coupled, and with the magnification and complication of the system, an association relationship among the members is over-complicated. Regarding this problem, a message-based communication method is introduced on the basis of the object architecture, and a message communication interface JMS is used to transmit the Rest information, thus making the life periods of the sending and receiving ends different, supporting asynchronous calling, and making the system structure further decoupled. In an embodiment, the operations of turning on, shutting down, suspending, etc. of a virtual machine between a portal and a cloud resource layer are realized in an asynchronous manner, and the portal may return without the need to wait for a response after sending out a command, thus improving user interaction effects.

The cloud operating system based on the above-mentioned hybrid architecture is able to satisfy the requirements of openness, compatibility and extension, On this basis, based on a construction-oriented design idea, the member management portal is responsible for managing metadata information about the members, supporting the operations of registration, deletion, modification, querying etc,, wherein a member is a triple {name, service set, access address, description} a service is a quadruple {name, type, message protocol, parameter list, key name, functional description, non-functional description}

In addition to describing and managing the members, a member management module further monitors a processing environment thereof, provides a basic service for ensuring the scalability and availability of the members, and perfecting the self-management capability of the cloud operating system.

2. Highly-Available Member Cluster Communication Method

Figure 2:
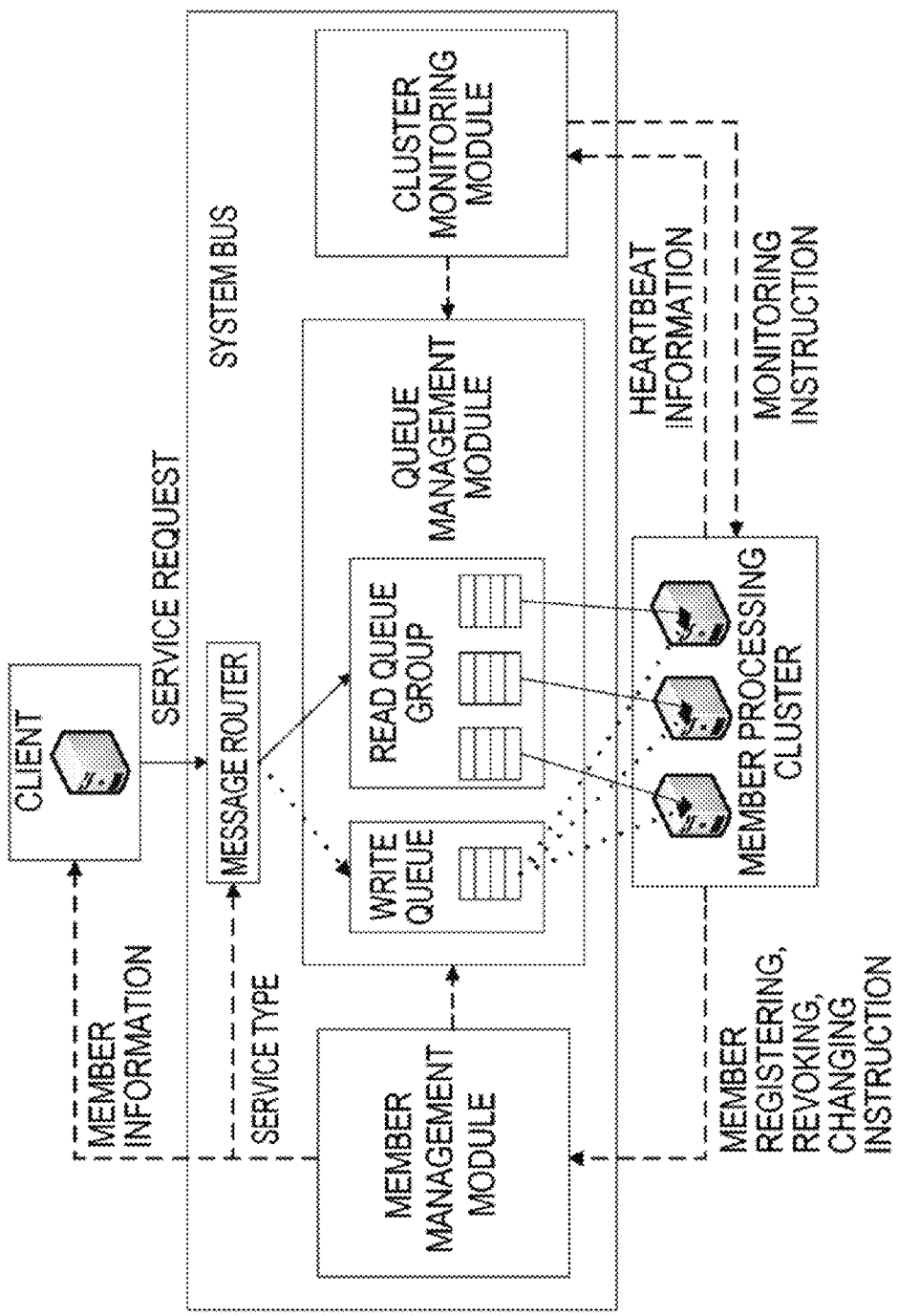
FIG. 2 is a diagram of a highly-available communication architecture supporting a stateful member cluster.

An embodiment of a highly-available member cluster discloed herein is as shown in FIG. 2, and mainly comprises the following modules:

a member management module, is responsible for establishing, deleting and adjusting a message queue group of a member according to member information;

a message router is responsible for distributing a message to the queue group according to routing information; and a node monitoring module is responsible for detecting the joining and quitting of various nodes of a member processing cluster, and acquiring resource configuration information about a processing node.

A member processing cluster is responsible for achieving a specific service function of the member, and is composed of several processing nodes.

A member client is responsible for initiating a use request for a member service.

Figure 3:
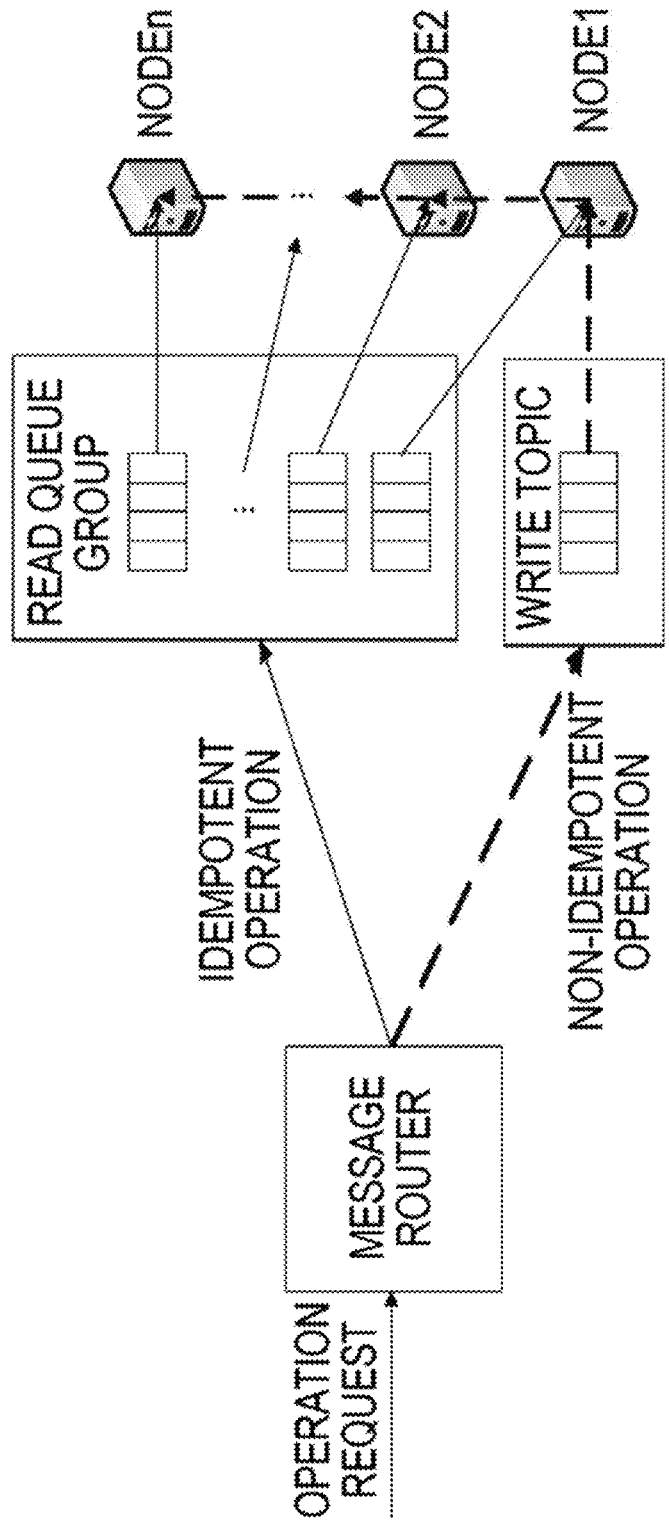
FIG. 3 is a schematic diagram of a read-write separation queue group.

On the basis of the above-mentioned architecture, when the member is registered, the system allocates a username user, a password psw and a unique member id thereto, and then a member processing cluster access process is:

1. the processing cluster initiates an access request to a system bus with an address being url; the system bus verifies a username, password and id of an access node; and if the verification is passed, a connection is established. The code is:

connection=ConnectionFactory.createConnection(user, psw,url);

2. a write operation topic is established, and each processing node of the member subscribes to a write operation from the topic;

write_topic=session.createTopic(id+"WRITE_TOPIC");
write_topic_consumer=session.createConsumer (write_topic);

3. the member realizes write processing in an onMessage method of a writeTopicListener, and registers to the system bus;

write_topic_consumer.setMessageListener(writeTopicListener);

4. a read operation queue group is established according to the number mum of processing nodes of the member, each processing node corresponding to one queue subscription read operation read_queue=session.createMultiQueue(num,id+"READ_QUEUE");
read_queue_consumer=session.createConsumer(read_queue); and 5. a specific read processing function is realized in an onMessage method of a readQueueListener, and registered to the system bus
read_queue_consumer.setMessageListener(readQueueListener);

On the basis of the above-mentioned read-write separation queue groups, service types of various members are distinguished in the member management module, setting the same as idempotent or non-idempotent. An idempotent operation belongs to an unstateful operation, the result of each execution in the same state being the same, and a non-idempotent operation belongs to a stateful operation, the result of each execution in the same state being different. A router performs routing according to the service type; the non-idempotent operation is sent to a unique write queue; and the idempotent operation is sent to different read queues according to a load balancing strategy, as shown in FIG. 3, wherein, a read operation load balancing flow process includes:

1. a processing capability of a node is calculated.

If a CPU frequency, memory capacity and I/O bandwidth of a node i are respectively $C_i$, $M_i$ and $B_i$, various resources of a cluster are the sums of various resources of nodes, i.e., $C=\Sigma C_i$, $M=\Sigma M_i$, $B=\Sigma B_i$.

Then a CPU weight value of the node i is $W_i^{CPU}=C_i/C$; the memory capacity $W_i^{RAM}=M_i/M$; and the I/O bandwidth $W_i^{IO}=B_i/B$.

If the required resource proportions of the member service are respectively $p^{CPU}$, $p^{RAM}$ and $p^{IO}$, the processing capability of the node i is $W_i=p^{CPU}W_i^{CPU}+p^{RAM}W_i^{RAM}+p^{IO}W_i^{IO}$.

2. A load of each node is calculated according to a read-write operation weight value.

If a read-write operation overhead ratio of a read queue $L_r$ to a write queue $L_w$ is a, a load of the node i is $L_i=L_i^R+aL_i^W$ and a load state of each node is $S_i=L_i/W_i$.

3. A node with the lightest load is selected for routing.

Figure 4:
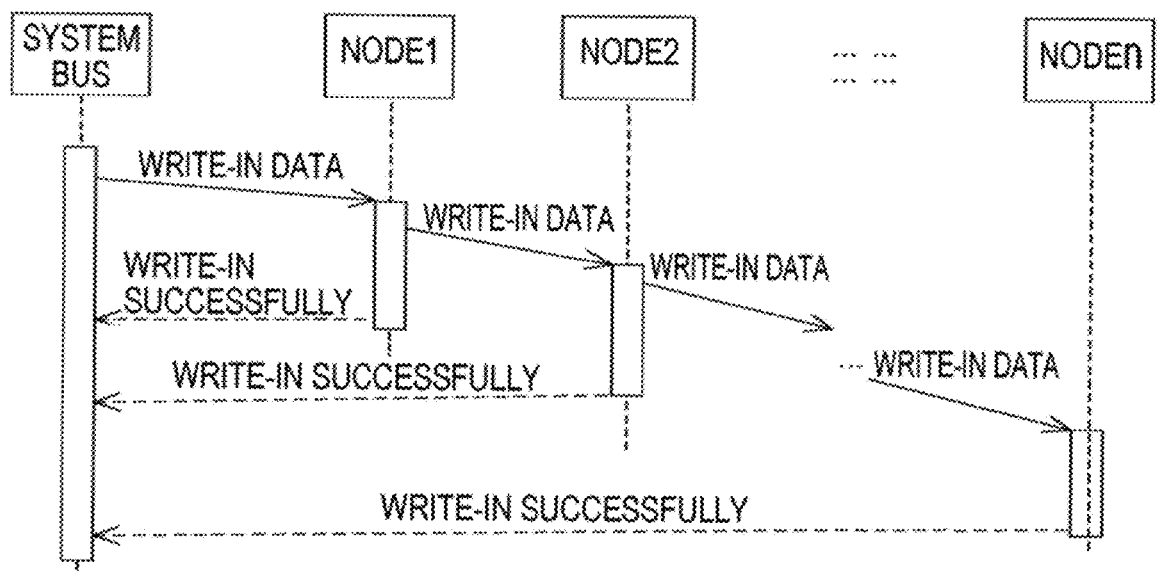
FIG. 4 is a diagram of a data write-in timing sequence.

The write operation is performed by means of pipeline, so as to improve the data write-in efficiency. As shown in FIG. 4, the process thereof is: a node 1 firstly being written-in with data, after being written-in with a data fragment of 64 KB, while continuing to receive data, forwarding the written-in 64 K data to a node 2, and receiving and forwarding data in the same manner from the node 2 to a node n until the node n is written-in with a last data fragment (not exceeding 64 KB).

Figure 5:
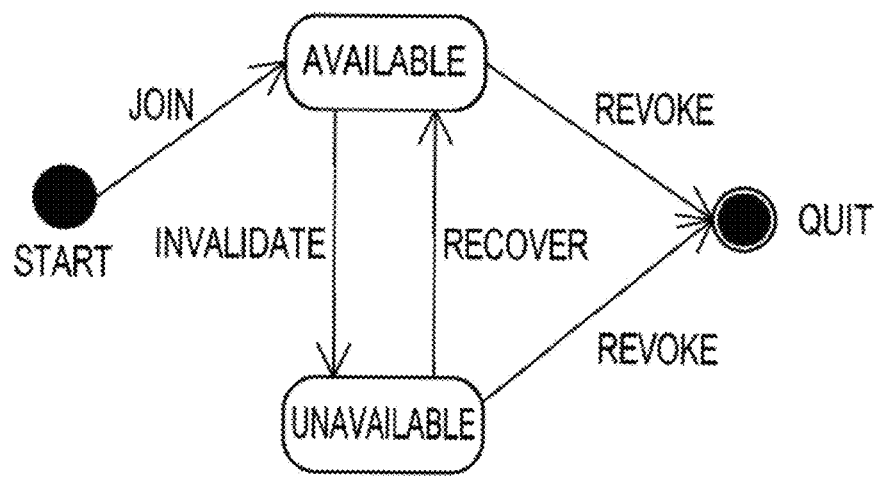
FIG. 5 is a diagram of node state transition.

On the basis of the above-mentioned communication method, a node monitoring module further sends joining, quitting, invalidation and. recovery events of the member processing node to the member management module, and the node state transition relationship is as shown in FIG. 5, wherein a node joining event refers to adding a processing node to the member; a node quitting event refers to revoking a processing node from the member; a node invalidation event refers to one processing node of the member being unavailable; and a node revival event refers to that one unavailable node of the member recovering availability.

Figure 6:
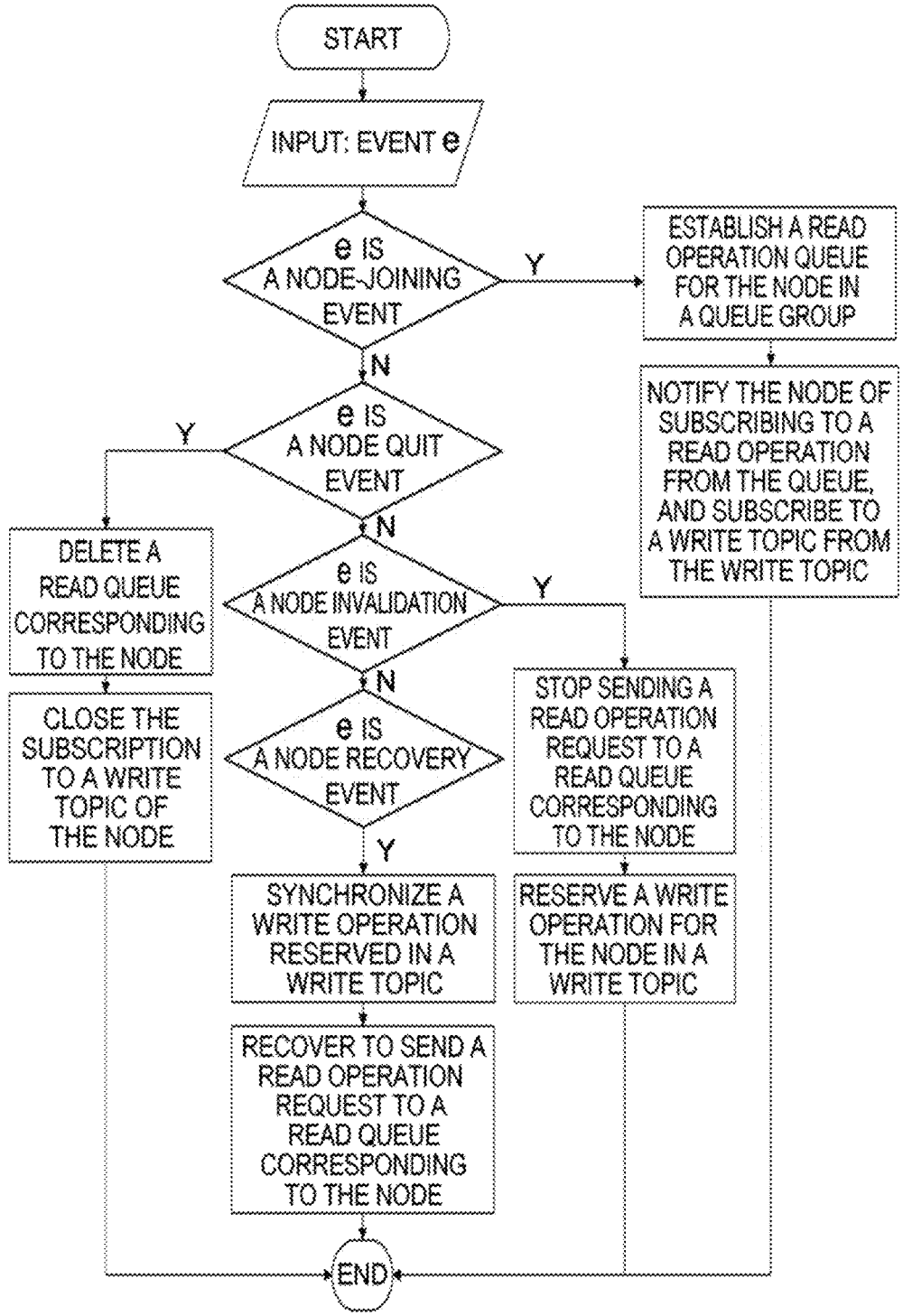
FIG. 6 is a flowchart of queue structure adjustment.

The member management module further adjusts the queue structure according to the node change event sent by the monitoring module, and the flow is as shown in FIG. 6:

1. when a node joins, establishing a read operation queue for the node in a queue group, and the node subscribing to a read operation from the queue, and subscribing to a write topic from the write topic;

2. when the node quits, deleting a read queue corresponding to the node, and closing the subscription to the write topic thereof;

3. when the node invalidates, stopping the sending of a read request to the read queue of the node, and reserving a write operation for the node in the write topic; and 4. when the node revives, synchronizing the write operation in the write topic, and recovering to send the read operation request to the read queue corresponding to the node.

An unstateful cluster load balancing method allocates operations to various nodes in a completely balanced way, which will result in inconsistent processing results in a stateful condition. By establishing a read-write separation queue and balancing the load regarding node capabilities, the above-mentioned method can avoid this problem, improve the communication performance of the stateful member cluster, and adjust the queue structure according to a node change event to ensure the high availability of the stateful cluster.

3. Horizontal scaling member cluster communication method

Figure 7:
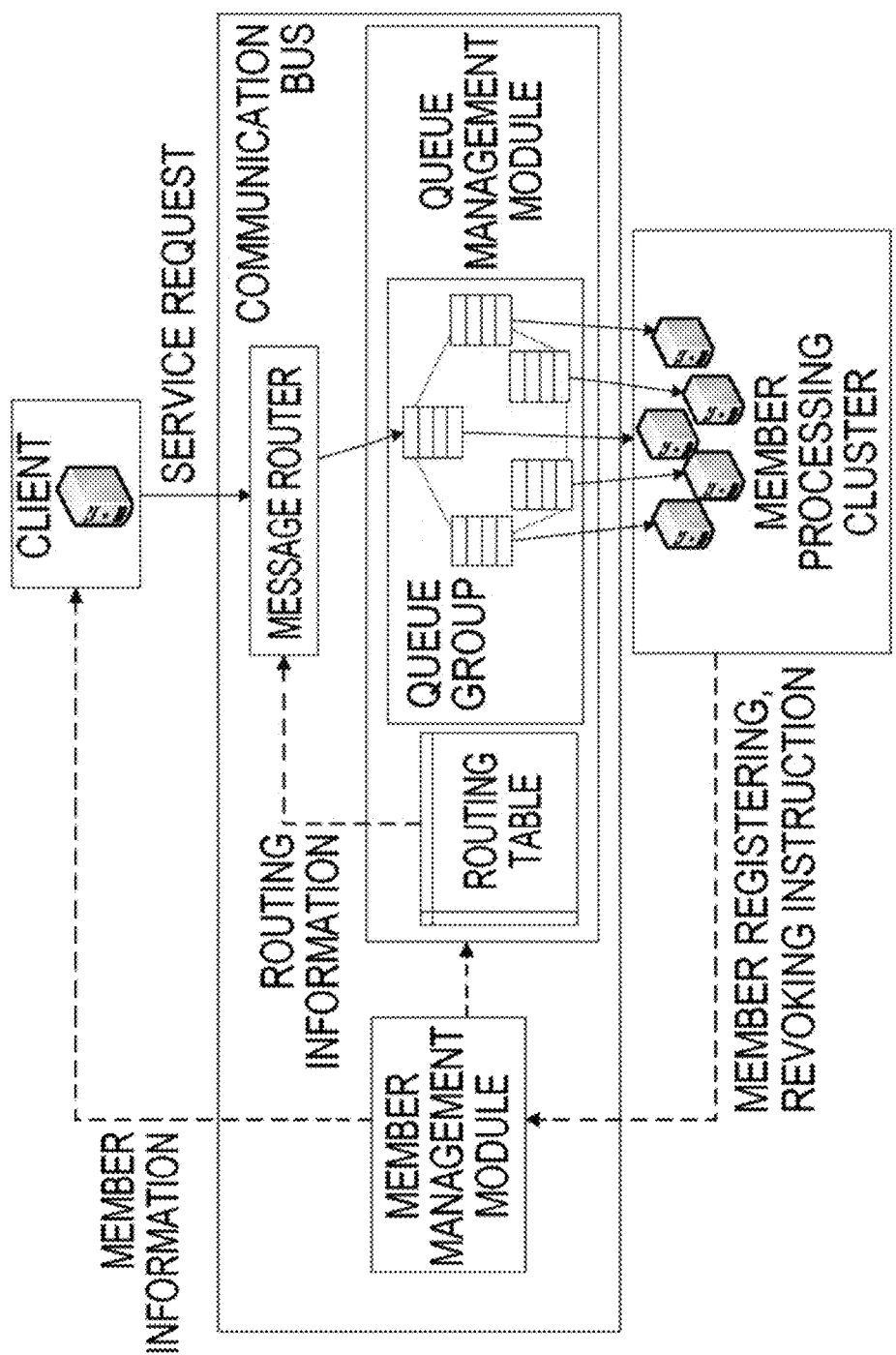
FIG. 7 is a diagram of a horizontal scaling member cluster communication architecture.
Figure 8:
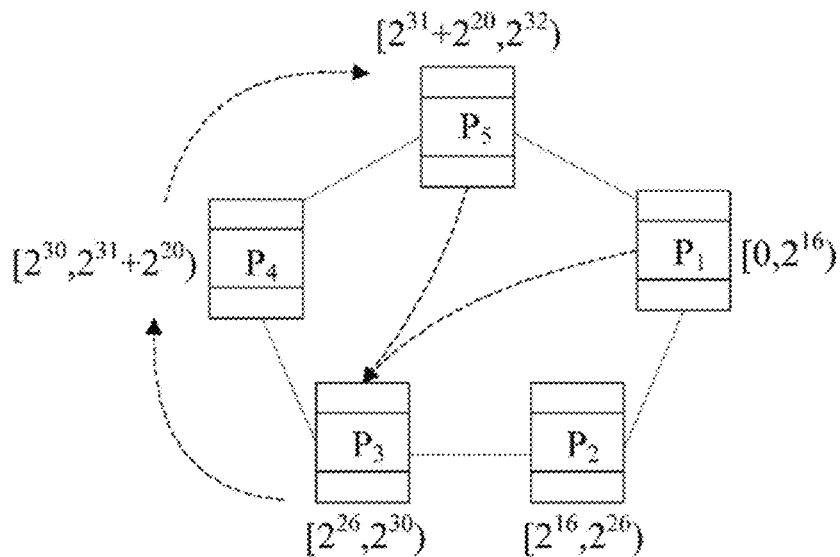
FIG. 8 is a schematic diagram of multilateral queue group routing.
Figure 9:
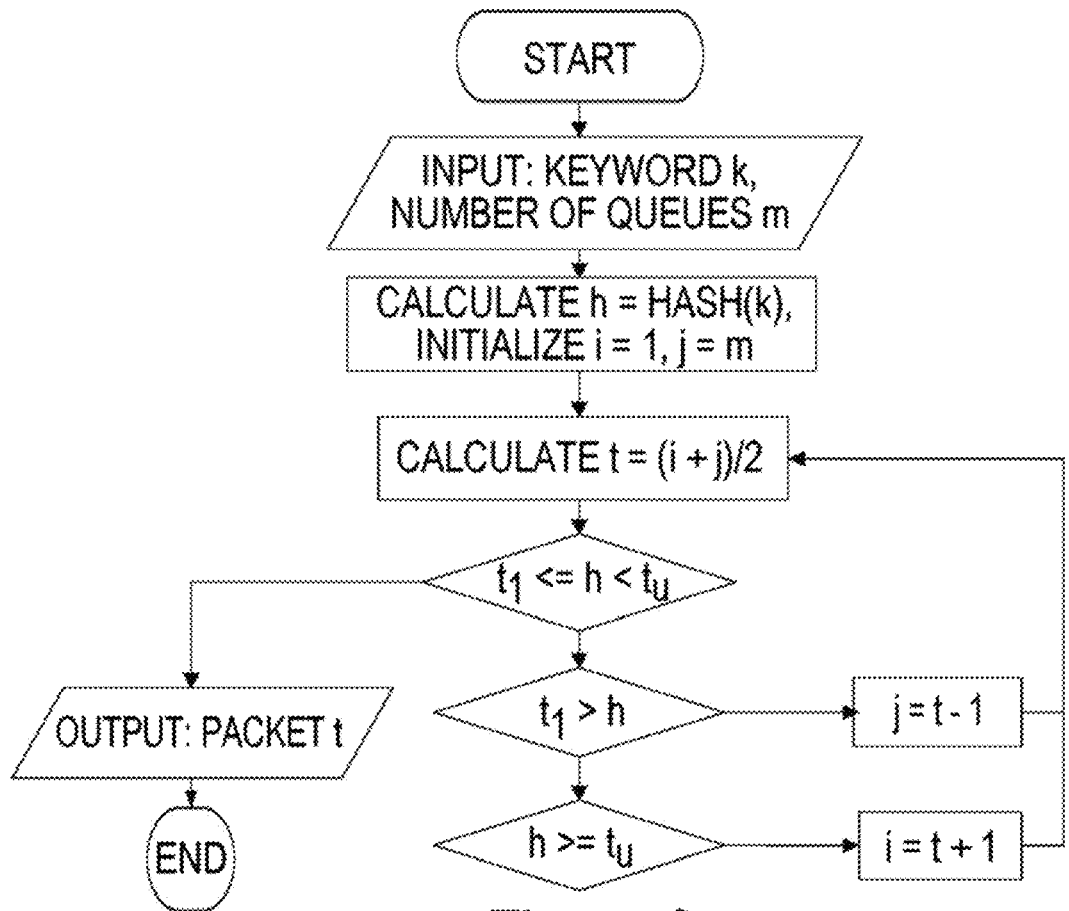
FIG. 9 is a flowchart of a multilateral queue group routing algorithm.

An embodiment of the disclosure herein provides a horizontal scaling member cluster communication method, as shown in FIG. 7. A member management module establishes a polygon queue group for each service of a member according to the number of nodes, each queue corresponding to one Hash value interval (packet), and binary lookup routing is performed according to the Hash value, a routing algorithm is as shown in FIG. 9:

1. calculating a Hash value h of a key 2. initializing a lower limit i of a packet as 1, and an upper limit j of the packet as the total number of packets in, 3. repeating 4. calculating a middle packet $t=(i+j)/2$, and checking Whether the packet t contains h 5. if h is smaller than the lower limit of the current packet, updating the upper limit $j=t-1$ 6. if h is greater than the upper limit of the current packet, updating the lower limit $i=t+1$, and 7. otherwise, returning to a node where an interval is located for routing.

The above-mentioned algorithm is equivalent to performing binary lookup by taking a packet as a node, the complexity being $O(\log_2 n)$, the algorithm efficiency being determined by the number of packets, and since the number of packets is much smaller than the keyword scale, the routing efficiency is improved. In addition, since a packet strategy is applied, only the keyword scale of some packets and data states of corresponding nodes need to be adjusted in the case where the number of nodes changes, improving the dynamic scaling efficiency.

On the basis of the above-mentioned communication methods, an embodiment of the disclosure herein provides a data state distribution method. In an initialization stage, Hash intervals needing to be processed by various nodes are divided according to node processing capabilities, and the calculation method of the node processing capabilities is as mentioned above, This method can divide Hash interval scales needing to be processed by queues of various nodes according to the node processing capabilities, can distribute data states according to proportions, and can achieve load balancing.

Other features and advantages of the present invention will be described in the following description and partly become obvious from the description, or will be understood by implementing the present invention. The objects and other advantages of the present invention can be realized and obtained through the structures indicated by the description, claims and drawings.

What claimed is:

1. A member-oriented hybrid cloud operating system, wherein the system establishing a hybrid architecture based on layer, object and message models, and applying a member-oriented idea to manage constituent members and a processing environment thereof, and on this basis, the system performing high-efficient routing, read-write separation and load balancing on a member processing cluster, satisfying the requirements of being open and compatible, loosely coupled and extensible for a cloud operating system, and solving the self-management problem, the horizontal scaling problem of members and the high availability problem of stateful members of an existing cloud operating system, from the perspective of a layer model, the system being divided into a portal layer, a logic layer, an adaptation layer and an implementation layer from top to bottom, with each layer being relatively independent, the openness being enhanced by respectively defining a standard interface at each layer, and the compatibility being enhanced by adapting different functions at various layers;

from the perspective of an object model, the cloud operating system being composed of the functional modules of a cloud portal, cloud management portal, cloud resource management, monitoring management, metering and billing, service approval, and authorization and authentication, various functional components performing communication by Rest message-based calling, capable of being combined with each other freely, and being distributed and deployed as required, a new module being able to be developed in a value-added manner as required, and the extensibility of a platform being enhanced by realizing interoperation among different modules in the logic layer, the cloud operating system which is installed in a minimized manner comprising only the modules of a cloud portal, cloud management portal and cloud resource management, on this basis, monitoring, billing, approval or other modules being customized and extended as required, performing communication by Rest message-based calling, and being distributed, deployed and developed in a value-added manner as required, and the extensibility of the system being enhanced by realizing interoperation among different modules in the logic layer; and a message-based communication being introduced to support asynchronous calling, and a message communication interface JMS being used to transmit a Rest message, thus making the system architecture further decoupled, and on this basis, a construction-oriented design being applied, and a member management portal being responsible for managing metadata of members and monitoring operation states thereof;

despite being able to realize extension, distribution and deployment as required, an object architecture belonging to an RPC (remote process call) synchronization communication manner, a sending end is able to continue execution after waiting for the response from a receiving end, and the processes of the two parties are closely coupled, and with the magnification and complication of the system, an association relationship among the members being over-complicated, regarding this problem, a message-based communication being introduced on the basis of the object architecture, a message communication interface JMS being used to transmit the Rest information, making the life periods of the sending and receiving ends different, supporting asynchronous calling and making the system structure further decoupled, at least the operations of turning on, shutting down and suspending of a virtual machine between a portal and a cloud resource layer being realized in an asynchronous manner, and the portal being able to return without the need to wait for a response after sending out a command, thus improving user interaction effects;

the cloud operating system based on the above-mentioned hybrid architecture being able to satisfy the requirements of openness, compatibility and extension, and on this basis, based on a construction-oriented design idea, the member management portal being responsible for managing metadata information about the members, supporting at least the operations of registration, deletion, modification and querying, wherein, a member is a triple, comprising: a name, a service set, an access address, and a description;

a service is a quadruple, comprising: a name, a type, a message protocol, a parameter list, a key name, a functional description, and a non-functional description;

in addition to describing and managing the members, a member management module further monitors a processing environment thereof, provides a basic service for ensuring the scalability and availability of the members, and perfects the self-management capability of the cloud operating system, and when a member is registered, the system allocates a username user, a password psw and a unique member id thereto, and then an access process of a member processing cluster comprises:

1) the processing cluster initiating an access request to a system bus with an address being url, the system bus verifying a username, password and id of an access node, and if the verification is passed, establishing a connection, the code being:

connection=ConnectionFactory.createConnection(user, psw,url);

2) establishing a write operation topic, and each processing node of the member subscribing to a write operation from the topic;

write_topic=session,createTopic(id+"WRITE_TOPIC");
write_topic_consumer=session.createConsumer (write_topic);

3) the member realizing write processing in an onMessage method of a writeTopicListener, and registering to the system bus;

write_topic$_{13}$ consumer.setMessagetistener(writeTopicListener);

4) establishing a read operation queue group according to the number mum of processing nodes of the member, each processing node corresponding to one queue subscription read operation read_queue=session.createMultiQueue(num,id+"READ_QUEUE");
read_queue_consumer=session.createConsumer(read_queue); and 5) realizing a specific read processing function in an onMessage method of a read QueueListener, and registering to the system bus read_queue_consumer.setMessageListener(readQueueListener);

on the basis of the above-mentioned read-write separation queue groups, service types of various members are distinguished in the member management module, setting the service types as idempotent or non-idempotent, an idempotent operation belonging to an unstateful operation, the result of each execution in the same state being the same, and a non-idempotent operation belonging to a stateful operation, the result of each execution in the same state being different, a router performing routing according to the service type, the non-idempotent operation being sent to a unique write queue, and the idempotent operation being sent to different read queues according to a load balancing strategy;

a read operation load balancing process comprises 1) calculating a processing capability of a node;
if a CPU frequency, memory capacity and I/O bandwidth of a node i are respectively $C_i$, $M_i$ and $B_i$, various resources of a cluster being the sums of various resources of nodes, i.e., $C=\Sigma C_i$, $M=\Sigma M_i$, $B=\Sigma B_i$;
then a CPU weight value of the node i is $W_i^{CPU}=C_i/C$, the memory capacity $W_i^{RAM}=M_i/M$, and the I/O bandwidth $W_i^{IO}=B_i/B$; and
if the required resource proportions of the member service are respectively $p^{CPU}$, $p^{RAM}$ and $p^{IO}$, the processing capability of the node i being $$W_i = p^{CPU}W_i^{CPU} + p^{RAM}W_i^{RAM} + p^{IO}W_i^{IO};$$

2) calculating a load of each node according to a read-write operation weight value;
if a read-write operation overhead ratio of a read queue $L_r$ to a write queue $L_w$ is a, a load of the node i being $L_i = L_i^R + aL_i^W$ and
a load state of each node being $S_i = L_i/W_i$ and
3) selecting a node with the lightest load for routing;
the write operation being performed by means of pipeline, so as to improve the data write-in efficiency, the process thereof comprises: a node 1 firstly writing in data, after writing in one data fragment of 64 KB, while continuing to receive data, forwarding the written-in 64 K data to a node 2, and receiving and forwarding data in the same manner from the node 2 to a node n until the node n writing in the last data fragment not exceeding 64 KB; and
on the basis of the above-mentioned communication manner, a node monitoring module further sending joining, quitting, invalidation and recovery events of the member processing node to the member management module, wherein a node joining event refers to adding a processing node to the member; a node quitting event refers to revoking a processing node from the member; a node invalidation event, refers to one processing node of the member being unavailable; and a node revival event refers to one unavailable node of the member recovering availability.

2. A communication method for a member-oriented hybrid cloud operating system, comprising a highly-available member cluster communication and a horizontal scaling member cluster communication, wherein:

the highly-available member cluster communication comprises: a member management module establishing a read-write separation queue group for each member cluster, the member management module further distinguishing service types of members into idempotent and non-idempotent, a router performing routing according to the service types, a non-idempotent operation being sent to a unique write queue, an idempotent operation being sent to different read queues according to a load balancing strategy, and on this basis, a node monitoring module sending joining, quitting, invalidation and recovery events of a processing node to the member management module, and the member management module further adjusting a queue structure according to a node change event, this method improving the communication performance of a stateful member cluster by means of read-write separation and load balancing, and adjusting the queue structure according to a node change to ensure the high availability of a member, and the member management module further adjusting the queue structure according to the node change event sent by the monitoring module, the process thereof comprising:

1) when a node joins, establishing a read operation queue for the node in a queue group, and the node subscribing to a read operation from the queue, and subscribing to a write topic from the write topic;
2) when the node quits, deleting a read queue corresponding to the node, and closing the subscription to the write topic thereof;
3) when the node invalidates, stopping the sending of a read. request to the read queue of the node, and reserving a write operation for the node in the write topic; and
4) when the node revives, synchronizing the write operation in the write topic, and recovering to send the read operation request to the read queue corresponding to the node;

an unstateful cluster load balancing method allocating operations to various nodes in a completely balanced way, which will result in inconsistent processing results in a stateful condition, and by establishing a read-write separation queue and balancing the load regarding node capabilities, the above-mentioned method is capbale of avoiding this problem and improving the communication performance of the stateful. member cluster, and by adjusting the queue structure according to a node change event, the high availability of the stateful cluster is ensured; and the horizontal scaling member cluster communication comprises: the member management module establishing a polygon queue structure for each service of a member according to the number of nodes, performing binary lookup routing according to a Hash value, the algorithm efficiency being determined by the number of Hash packets which is much smaller than a keyword scale, thus improving the routing efficiency, and in the case where the number of nodes changes, only some node data states needing to be adjusted, improving the dynamic scaling efficiency, and on the basis of the above-mentioned communication method, in an initialization stage, Hash intervals needing to be processed by various nodes being divided according to node processing capabilities, forming a routing table, realizing the distribution of data states according to proportions, and achieving load balancing:

the member management module establishing a polygon queue group for each service of a member according to the number of nodes, each queue corresponding to one Hash value interval or packet, and performing binary lookup routing according to the Hash value, the routing algorithm comprising:

1) calculating a Hash value h of a key;
2) initializing a lower limit i of a packet as 1, and an upper limit j of the packet as the total number of packets in;
3) repeating;
4) calculating a middle packet $t=(i+j)/2$, and checking whether the packet t contains h;
5) if h is smaller than the lower limit of the current packet, updating the upper limit $j=t-1$;
6) if h is greater than the upper limit of the current packet, updating the lower limit $i=t+1$; and 7) otherwise, returning to a node where an interval is located for routing; and the above-mentioned algorithm being equivalent to performing binary lookup by taking a packet as a node, the complexity being $O(\log_2 n)$, the algorithm efficiency being determined by the number of packets, and since the number of packets is much smaller than the keyword scale, the routing efficiency being improved, in addition, since a packet strategy is applied, only the keyword scale of some packets and data states of corresponding nodes need to be adjusted in the case where the number of nodes changes, improving the dynamic scaling efficiency.

* * * * *